US009374667B1

(12) United States Patent
Jorgensen et al.

(10) Patent No.: US 9,374,667 B1
(45) Date of Patent: Jun. 21, 2016

(54) BLUETOOTH LOW ENERGY RAPID ROOM ENTRY SYSTEM AND METHOD

(71) Applicant: Awarepoint Corporation, San Diego, CA (US)

(72) Inventors: Gary Jorgensen, San Diego, CA (US); Wei Geng, San Diego, CA (US); Matt Delmage, San Diego, CA (US); Brian Costabile, San Diego, CA (US); John Taylor, San Diego, CA (US)

(73) Assignee: AWAREPOINT CORPORATION, San Diego, CA (US)

( * ) Notice: Subject to any disclaimer, the term of this patent is extended or adjusted under 35 U.S.C. 154(b) by 0 days.

(21) Appl. No.: 14/667,021

(22) Filed: Mar. 24, 2015

(51) Int. Cl.
*H04W 4/02* (2009.01)
*G08C 17/02* (2006.01)
*H04W 4/00* (2009.01)

(52) U.S. Cl.
CPC ............... *H04W 4/021* (2013.01); *G08C 17/02* (2013.01); *H04W 4/008* (2013.01)

(58) Field of Classification Search
CPC ..................................................... H04W 4/021
See application file for complete search history.

(56) References Cited

U.S. PATENT DOCUMENTS

| 2012/0115512 | A1* | 5/2012 | Grainger et al. ........... 455/456.3 |
| 2014/0148196 | A1* | 5/2014 | Bassan-Eskenazi et al. .......................... 455/456.1 |
| 2014/0195256 | A1* | 7/2014 | Wagner et al. .................... 705/2 |
| 2014/0237076 | A1* | 8/2014 | Goldman et al. ............. 709/217 |
| 2014/0274150 | A1* | 9/2014 | Marti et al. ................. 455/456.3 |
| 2015/0071274 | A1* | 3/2015 | Sugar et al. ................... 370/338 |

* cited by examiner

*Primary Examiner* — David Bilodeau
(74) *Attorney, Agent, or Firm* — DLA Piper LLP (US)

(57) ABSTRACT

A system and method for rapid room entry are provided in which at least two Bluetooth low energy (BLE) beacons may be used to determine when a BLE enabled object has crossed a boundary. The BLE enabled object may sense the signals from BLE beacon and a location engine may determine the crossing of the boundary based on the sensed signals from each BLE beacon. Each BLE beacon may have a directional antenna so that a portion of the signal having a strong strength is directed towards the boundary and a portion of the signal having a weaker strength is directed away from the boundary.

31 Claims, 11 Drawing Sheets

BLUETOOTH LOW ENERGY RAPID ROOM ENTRY SYSTEM AND METHOD

FIELD

The disclosure relates generally to Bluetooth Low Energy (BLE) devices and in particular to a system and method for determining the crossing of a boundary in a real-time location system using BLE.

BACKGROUND

BlueTooth Low Energy (aka BLE) is a low energy variant of the BlueTooth short range wireless standard that was introduced as part of the BlueTooth 4.0 specification. Further details about BLE and the Bluetooth 4.0 specification may be found at https://www.bluetooth.org/en-us/specification/adopted-specifications and https://developer.bluetooth.org/TechnologyOverview/Pages/BLE.aspx which are incorporated herein by reference. The purpose of BLE is to provide an extremely low power wireless system similar in power consumption to Zigbee. Zigbee is an older wireless low power communication standard.

Shortly after the introduction of BLE chipsets, Apple® introduced a product called iBeacon along with a simple protocol specification, all based on BLE. Further details of the iBeacon product and its protocol specification may be found at https://developer.apple.com/ibeacon/ which is incorporated herein by reference. iBeacon provides a BLE beacon (transmit only) that devices (e.g. cell phones) may receive and use to determine a rough location. The location technology is simple proximity based on the RSSI (received signal strength indication) of the beacon as seen by the receiving device.

In addition, a differential location service, based on BLE broadcast messages, exists in which a location algorithm is used in conjunction with RSSI and other information to determine an RTLS (real time location system)-level accurate location. In these known systems, the service operates with only a single beacon and the beacon uses a omnidirectional antenna. However, these known system do not provide rapid room entry.

DETAILED DESCRIPTION OF ONE OR MORE EMBODIMENTS

Figure 1:
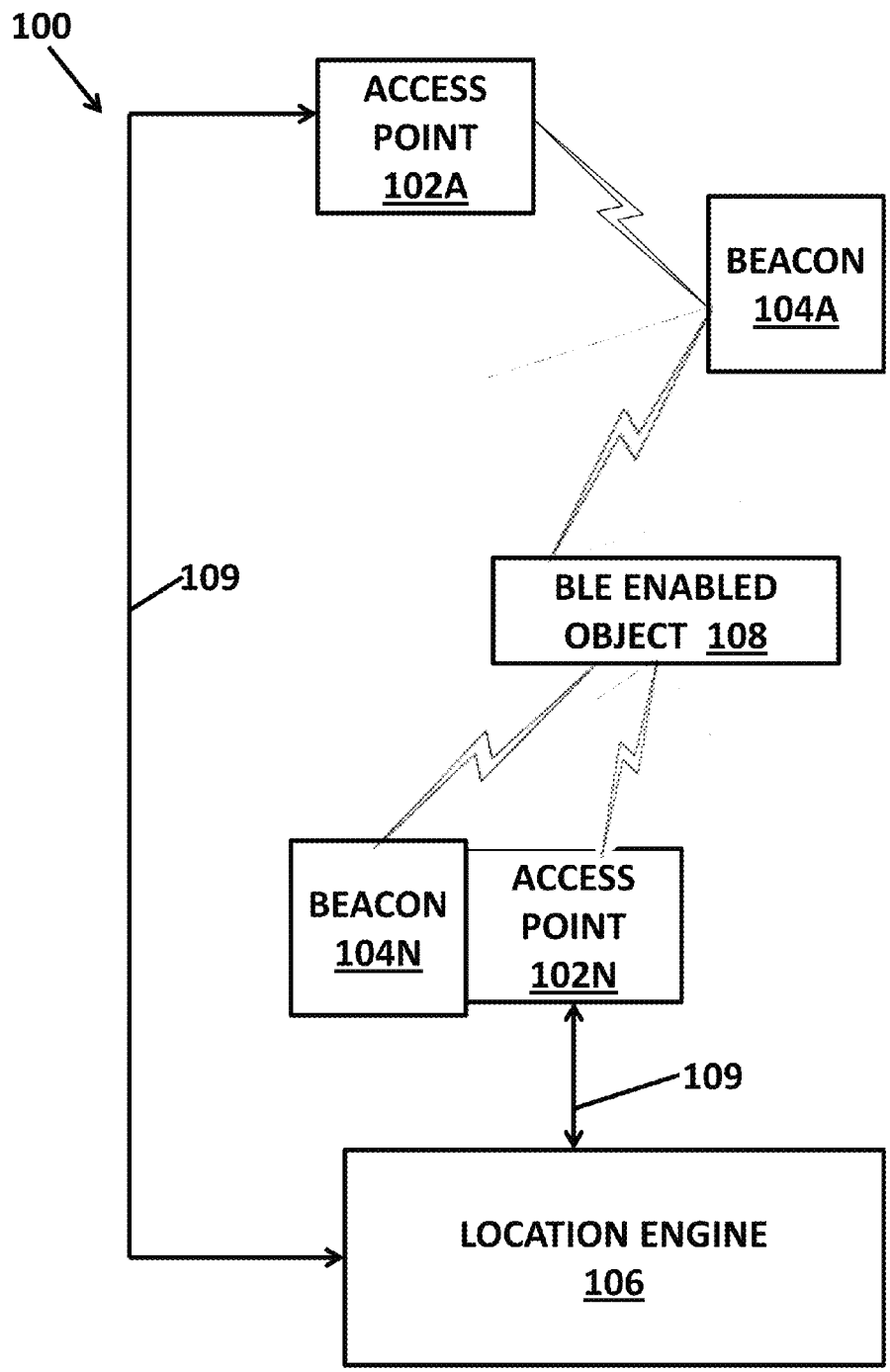
FIG. 1 illustrates an example of a real time location system that may include a rapid room entry component.

The disclosure is particularly applicable to a BLE beacon based rapid room entry system and method and it is in this context that the disclosure will be described. It should be appreciated that the BLE beacon based rapid room entry system and method may be used as a standalone system as shown in the diagrams below, it may be combined with various known real time location system (RTLS) that may use different technologies or it may be combined with an RTLS system that uses BLE for both the RTLS and the rapid room entry. The rapid room entry system and method may provide a location of a BLE enabled object (and whether the BLE enabled object has crossed a boundary) in less than 3 seconds and within less than one meter of accuracy in a three dimensional space. The three dimensional space may be a building and the rapid room entry system and method permits accurate location at a room, bay, and bed level in the three dimensional space to be determined. The boundary may be, for example, a boundary to a room, such as a door, a boundary to a space, such as a hallway or meeting area, or a boundary to a particular location identified by set of coordinates (X,Y or X,Y,Z for example). The determination of the rapid room entry of the BLE enabled object may be used for staff and patient locating and their associated workflows as well as high accuracy asset tracking in a hospital embodiment.

The BLE enabled object described below may be any object (including a human being) that has a BLE receiver device (or has a BLE receiver associated with the human being) that is able to sense BLE messages. For example, each BLE enabled object may be a smartphone device with a BLE receiver (or an attached BLE receiver), a BLE tag, a medical device including various medical equipment with a BLE receiver (or an attached BLE receiver), other computing devices, such as laptop or tablet computers, that have a BLE receiver (or an attached BLE receiver), other communication devices, such as cellular phones, that have a BLE receiver (or an attached BLE receiver) and/or physical assets in the three dimensional space, such as a bed, medical personnel, such as a doctor or a nurse, etc. that have a BLE receiver (or an attached BLE receiver).

The rapid room entry system and method may be used for a set of areas in the three dimensional space (with well-defined boundaries) in which quick and high accuracy determining of a BLE enabled object entry or exit into/from the area is required. To determine a crossing of a boundary by the BLE enabled object in the three dimensional area, the system may have BLE beacons with directional antenna mounted on either side of each boundary, with a weaker side of the radiated energy pattern due to the directional antenna pointed into the boundary area and the strong side of the radiated energy pattern due to the directional antenna pointed away from the boundary. The difference between the strong signal and the weak signal may be 20 dB that can be identified by the system. The system may, optionally, also have other directional and omnidirectional beacons mounted in the three dimensional space as needed to provide complete BLE coverage. The system may include one or more BLE enabled objects as described above which receive broadcasts from the BLE beacons on a periodic or continuous basis and relay one or more characteristics of the signal, such as for example, received signal strength and other information in one embodiment, to a location engine that may use a location method to determine if the BLE enabled object has crossed the boundary in the three dimensional space.

The location engine may be on a remote computer system from the BLE enabled object and the BLE enabled object may communicate via Wi-Fi or other wireless technology with the location engine. Alternatively, the location engine (and its location method) may be resident on the BLE enabled object that has the memory and processing power to perform the location method. For example, if the BLE enabled object is a smartphone device, such as an Apple® iPhone® or Android® OS based device, the location engine may be executed by the processor of the BLE enabled object. Regardless of the location of the location engine, the location engine executes the location method and uses the received one or more characteristics of the signal from one or more BLE beacons to determine a highly accurate location including whether the BLE enabled object crossed a boundary in the three dimensional space. The location method may receive signals from at least two BLE beacons and then determine the boundary crossing as described below. In addition, the location method may receive signals from only one BLE beacon and also be able to determine the presence in an area of the BLE enabled object based on the proximity of the BLE beacon and the BLE enabled object.

FIG. 1 illustrates an example of a real time location system 100 that may include a rapid room entry component. The system 100 has one or more wireless access points 102, such as AP 102A, . . . , 102N as shown in FIG. 1, that may be coupled over a network 109 to a location engine 106. In one embodiment, each wireless access point may communicate using a known Wi-Fi protocol, but the wireless access point may also use other wireless communication protocols. The system may also have one or more Bluetooth Low Energy (BLE) beacons 104, such as beacon 104A, . . . , 104N as shown in FIG. 1, and each BLE beacon may be at a fixed location in the three dimensional space and that location is known by the location engine 106. For example, the system may have at least one BLE beacon at each side of a boundary (as described below) and then be able to perform a rapid room entry determination based on the signals from the at least two BLE beacons. The BLE beacons 104 may include BLE beacons with directional antennas (at each boundary), BLE beacons with omnidirectional antennas and BLE beacons that transmit an Awareware Corporation protocol signal.

As shown in FIG. 1, some beacons 104N may be physically located adjacent an access point 102N. The system may also have one or more BLE enabled objects 108 whose accurate location and boundary crossing may be determined by location engine 106. Each BLE beacon 104 may periodically or continuously transmit a BLE messages that may be sensed by a BLE enabled object 108. The BLE enabled object 108 may generate one or more characteristics of the one or more BLE beacon signal(s) and then communicate the one or more characteristics of the BLE beacon signal(s) to the location engine 106 over the network 109 using the AP 102N. The location engine may generate a determination, based on the one or more characteristics of the BLE beacon signal(s), whether the BLE enabled object that received the BLE beacon signals has crossed a boundary in the three dimensional space in less than 3 seconds in part due to the fast "blink" rate (a rate at which the BLE beacon generates its beacon signal).

Figure 2:
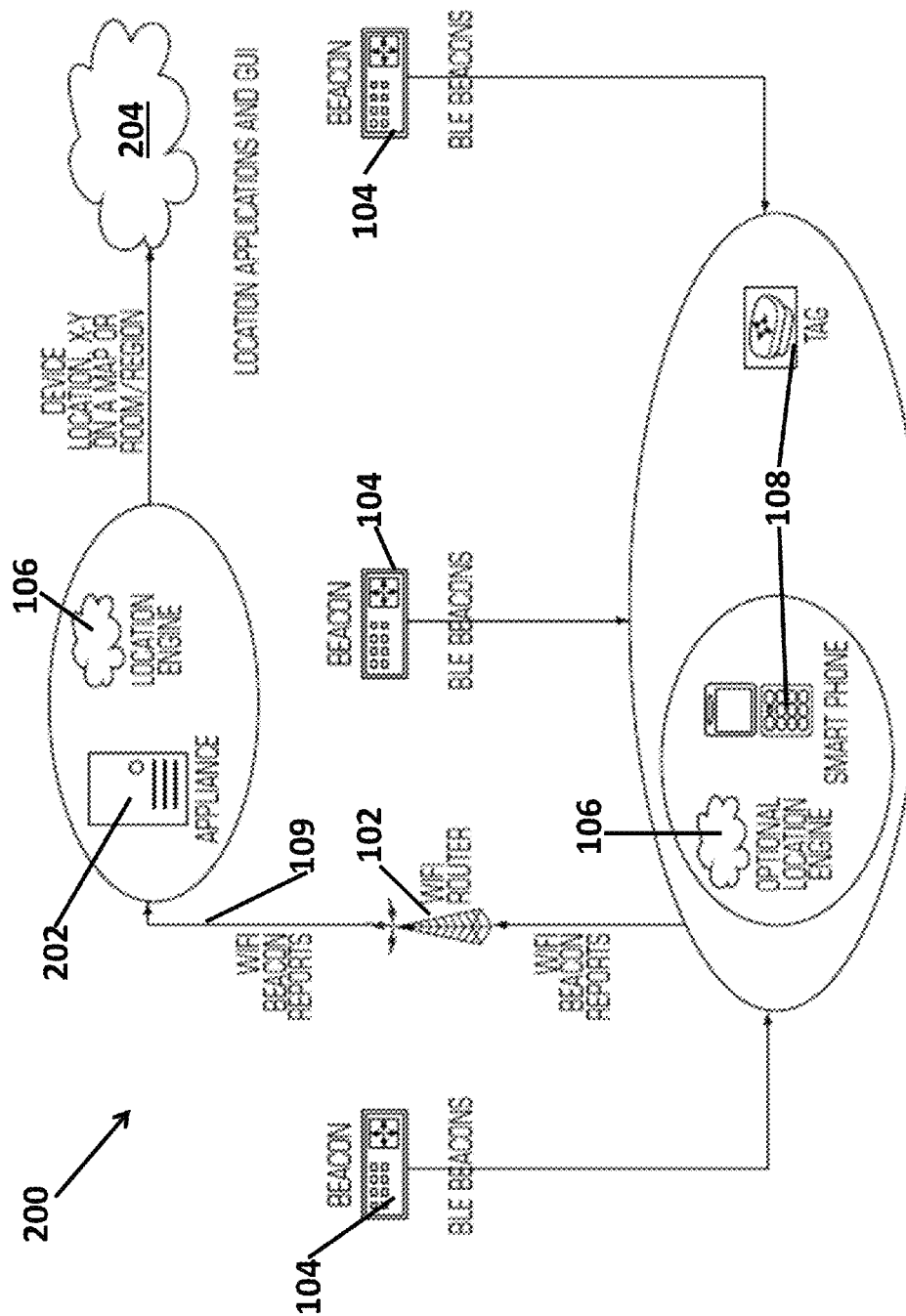
FIG. 2 illustrates another example of an implementation of a real time location system that may include a rapid room entry component.

FIG. 2 illustrates another example of an implementation of a real time location system 200 that may include a rapid room entry component. As with the implementation shown in FIG. 1, the system has the one or more BLE beacons 104, one or more BLE enabled objects 108 (shown as a smartphone and a BLE tag) and the network 109 that has one or more access points 102. In this implementation as shown in FIG. 2, the location engine 106 may be remotely located from some of the one or more BLE enabled objects 108 and may be resident on at least one of the BLE enabled objects 108. In this implementation, the remote location engine 108 may be resident and operating on a hardware appliance 202 that may also be coupled to the network 109 and able to communicate over that network. For example, the location engine on the hardware appliance may receive BLE beacon data reports from the one or more BLE enabled objects 108 over the network 109 that may be a Wi-Fi network or other network. The location engines 106 operate in a similar manner as described above in FIG. 1 and also as described in more detail below. In this implementation, the location engine 106 on the appliance 202 may communicate data about BLE enabled object location (or boundary crossing), coordinates of the one or more BLE enabled objects 108 on a map and/or a room/region of the one or more BLE enabled objects 108 in the three dimensional space to other locations applications and a graphical user interface 204.

In both of the implementations in FIGS. 1 and 2, the system 100, 200 may be installed in a three dimensional space in which two BLE beacons may be installed near each boundary (for example, one each side of the boundary) in the three dimensional space (to determine the crossing of a boundary). The three dimensional space may be a building (single floor or multiple floors) in which the occupant of the building wants to track BLE enabled objects within the three dimensional space. For example, the above described system may be used for a hospital, a manufacturing facility or other building in which it would be desirable to track BLE enabled objects within the building and determine boundary crossings of the BLE enabled objects within the building.

Figure 3A:
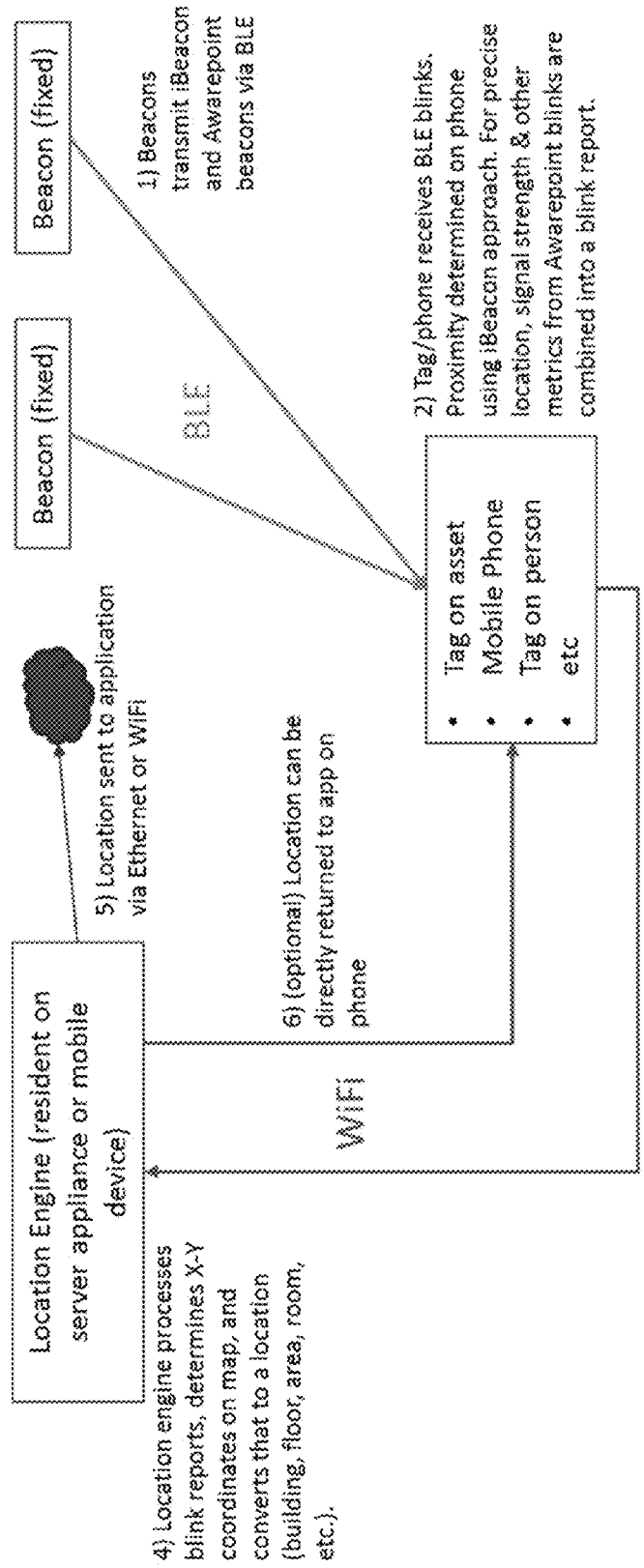
FIG. 3A illustrates an example of the data flow within the real time location system.

FIG. 3A illustrates an example of the data flow within the real time location system using a BLE wireless protocol and a Wi-Fi protocol. Each beacon 104 (that is in a fixed position) may generate and transmit an iBeacon protocol message or an Awarepoint Corporation protocol message (either one being known as a blink) via the BLE communication protocol to the one or more BLE enabled objects 108. Each BLE enabled object 108 (that may be a BLE tag on an asset, a smartphone device or mobile phone, a tag on a person, etc) may receive blinks from one or more BLE beacons 104 (a signal from each BLE beacon) (shown at process 302 in the method 300 in FIG. 3B). The proximity of the BLE enabled object 108 may be determined (on a BLE enabled smartphone that has the location engine 106) to one of the BLE beacons 104 using a known iBeacon approach. Thus, for example, the BLE enabled object 108 may be determined to have crossed a boundary into an area since the BLE enabled object 108 is closest to a BLE beacon 104 that is located in the area, such as a room. Each BLE enabled object 108 may also or alternatively determine one or more characteristics of each signal from each BLE beacon (such as for example received signal strength and other metrics) and generate a beacon report for each BLE beacon 104 (shown at process 304 in the method 300 in FIG. 3B) that includes the one or more characteristics of the signal and an identifier of a particular BLE enabled object 108 that received the blink from the BLE beacon.

Each beacon report may be sent to the location engine 106 (remote on an appliance or resident on the BLE enabled object 108 that is smartphone device). If the location engine is remote, each beacon report may be communicated to the location engine over the Wi-Fi network. The location engine 106 may process the beacon reports for a particular BLE enabled object 108 and may determine an X-Y coordinate location on a map of the particular BLE enabled object 108 and may then convert the coordinates to a location in the three dimensional area (building, floor, area, room, etc.) of the particular BLE enabled object 108. The location engine may also determine, for the particular BLE enabled object 108, whether the particular BLE enabled object 108 crossed a boundary in the three dimensional area based on the beacon reports as described below in more detail. Once the location of the particular BLE enabled object 108 is determined (or a boundary crossing of the particular BLE enabled object 108 is determined), it may be sent to other systems via various networks for different uses. Optionally, the location or boundary crossing of the particular BLE enabled object 108 may be communicated back to the particular BLE enabled object 108.

Figure 3B:
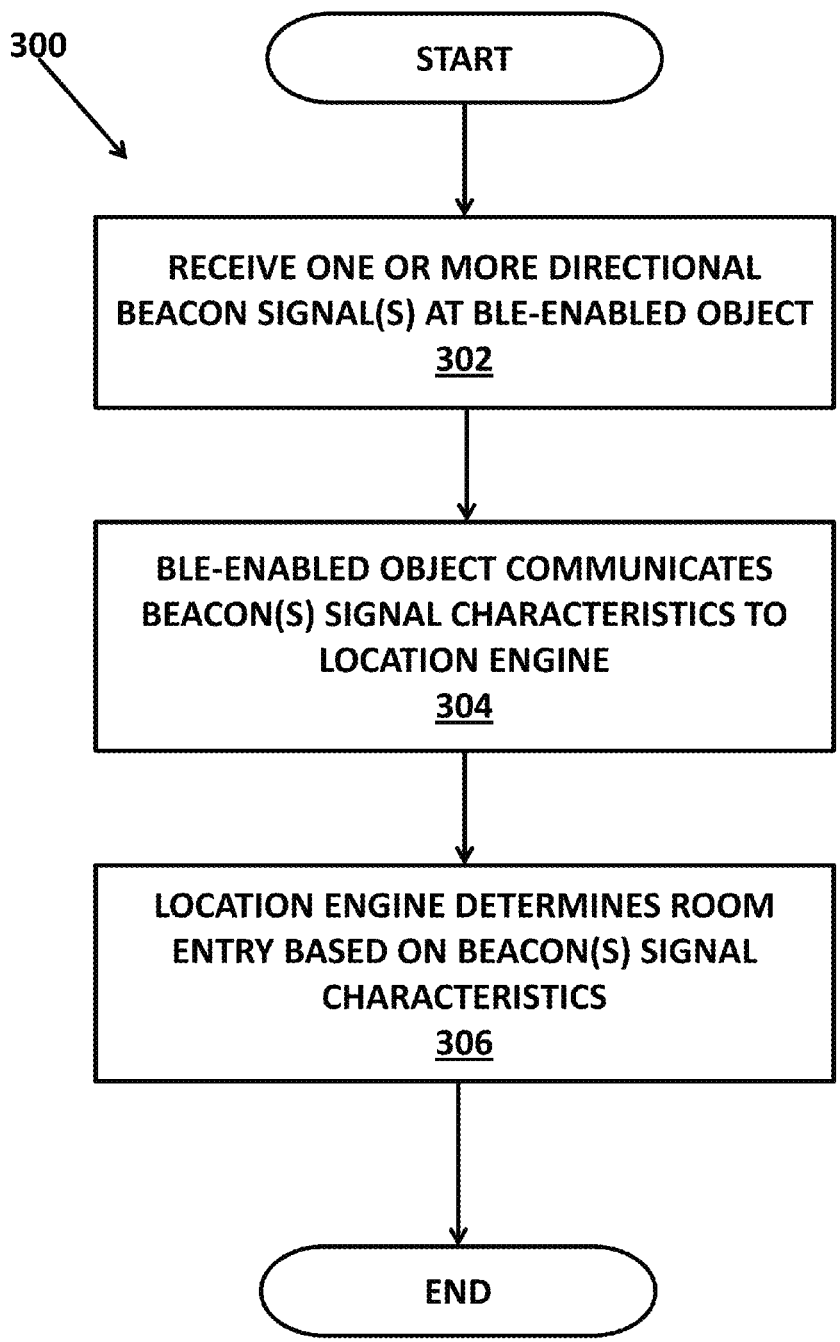
FIG. 3B illustrates a method for determining rapid room entry.
Figure 8:
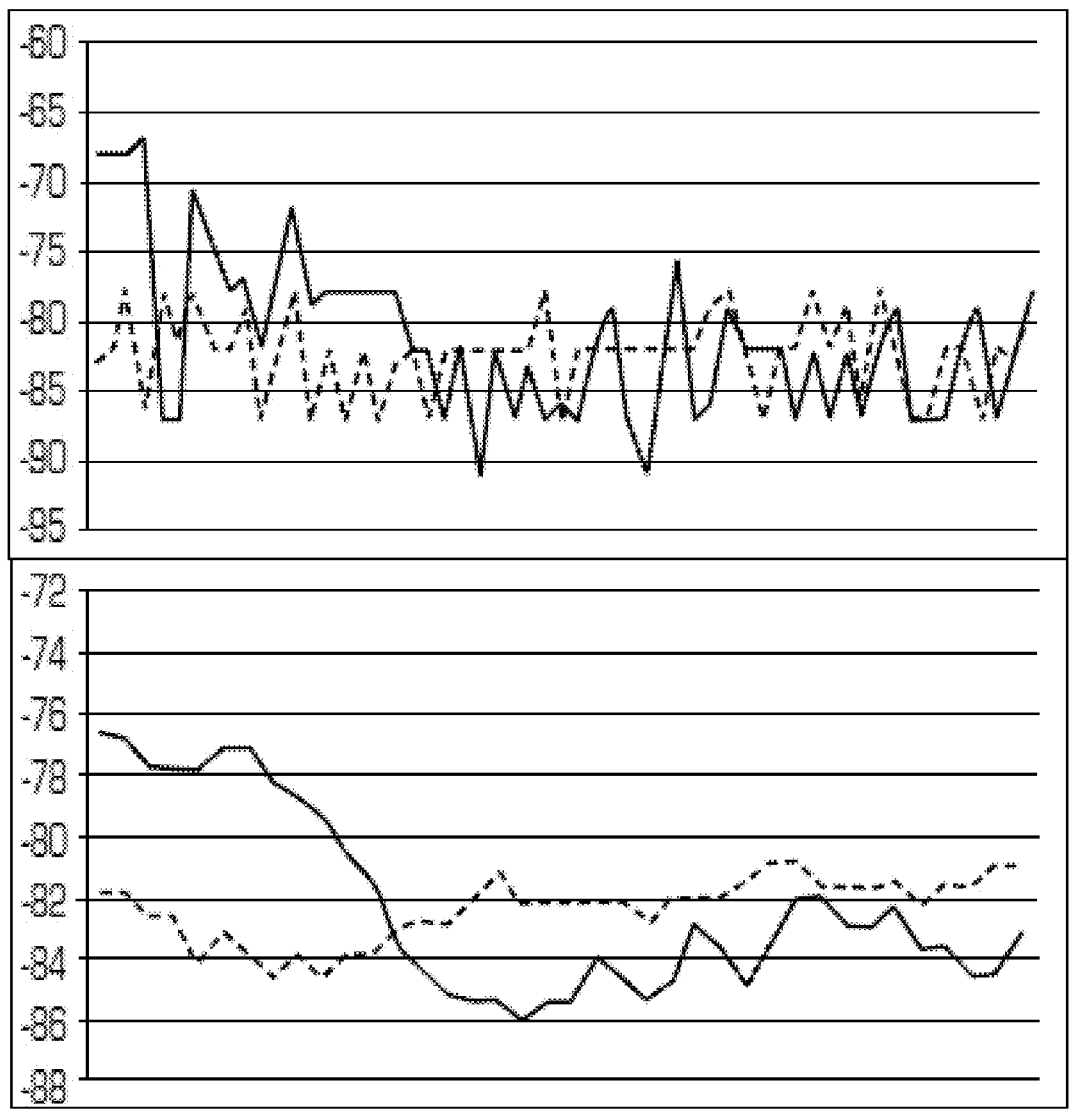
FIG. 8 illustrates an example of the raw and smoothed RSSI values for two BLE beacons that can be used to determine when a user crossed a boundary.

FIG. 3B illustrates a method 300 for determining rapid room entry. In addition to the process 302 and 304 already described above, the method, being executed by the location engine, may determine crossing a boundary (for example, entering or exiting a room through a door) based on the one or more characteristics of the one or more BLE beacons received by the particular BLE enabled object (306). This process may be implemented using the method set forth in FIG. 3C or it may be implemented by comparing the RSSI of each beacon (when the BLE enabled object receives signals from at least two BLE beacons) and determining the intersection of the two RSSI signals as shown in FIG. 8.

Figure 3C:
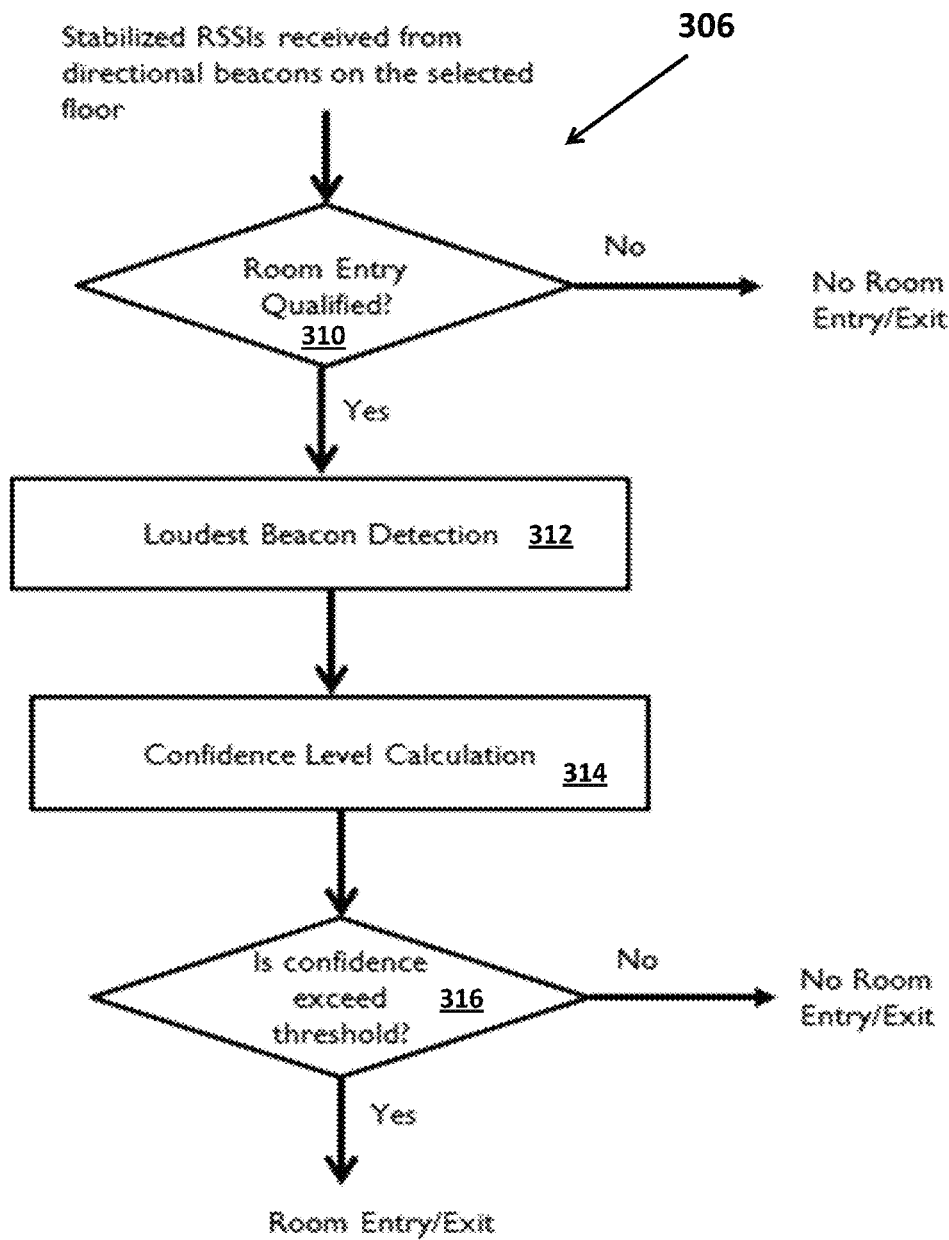
FIG. 3C illustrates more details of the raid room entry location method carried out by the location engine.

FIG. 3C illustrates more details of the rapid room entry location method 306 carried out by the location engine. In a hospital example, the Fast Room Entry method is designed to detect staff and patient location and their associated workflow as well as high accuracy asset tracking. The room entry and exit detection latency is typically sub 3 seconds with high accuracy (>=99%). The method may first determine how probable a particular BLE enabled object is near a boundary and is attempting a boundary crossing/transition (enter/exit) as opposed to the particular BLE enabled object being somewhere far away for the boundary based on the received beacon reports (310). If the criteria are met, the room entry determination is performed. Since the directional BLE beacons are deployed along the boundaries, a "loudest" beacon (the BLE beacon with the strongest signal) may be detected (312). However, the location transition only occurs when the confidence threshold is exceeded (314). The confidence level calculation includes many factors and these factors include, but are not limited to, differential signal strength of the loudest BLE beacon with regard to the remaining BLE beacons, is the BLE beacon signal strength support the boundary transition event, where the BLE enabled object was and if the transition is logical based on previous location and the current estimate with regard to the room/hallway layout etc. The method may then determine, based on the confidence level, if the threshold has been exceeded and the BLE enabled object has crossed a boundary, such as through a door into or out of a room.

Figure 4:
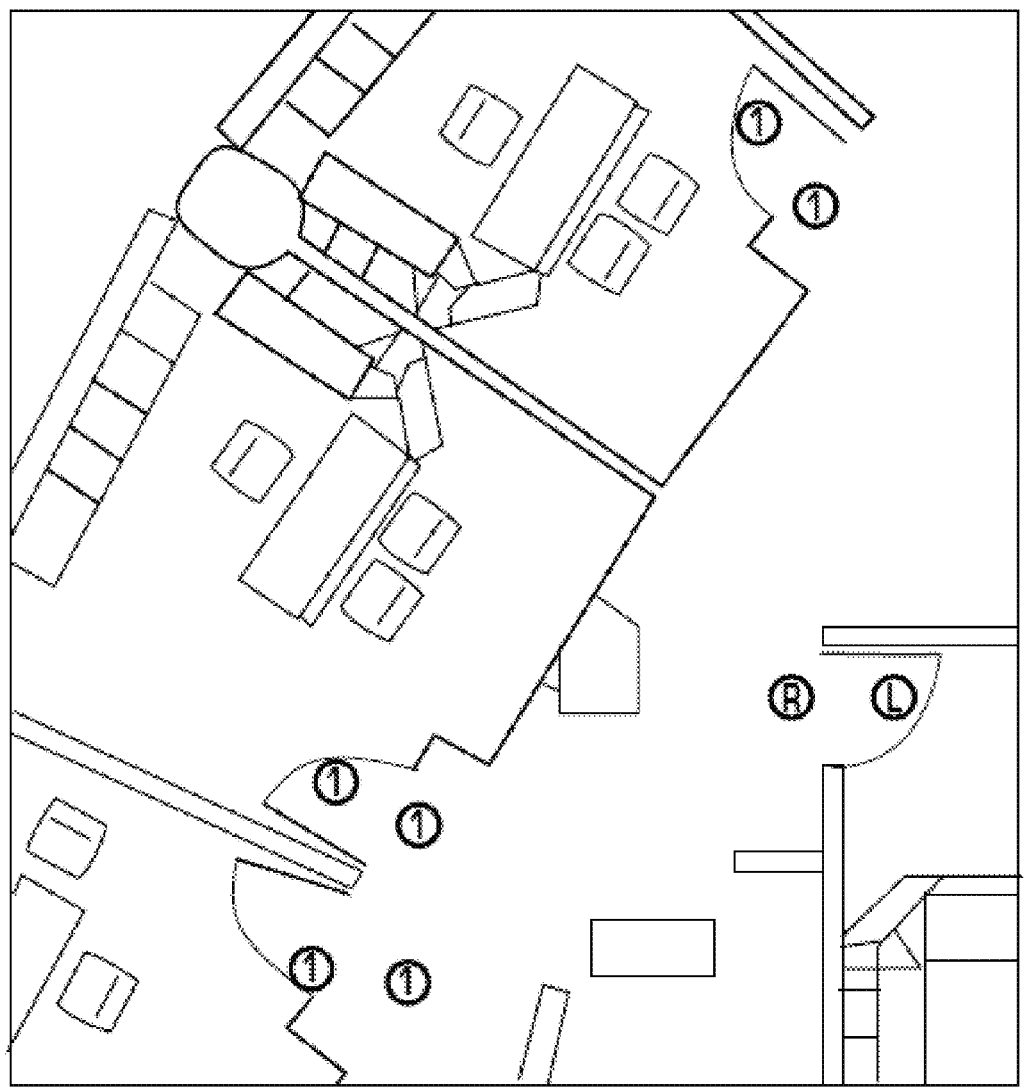
FIG. 4 illustrates an example of a building with one or more boundaries and BLE beacons.
Figure 5:
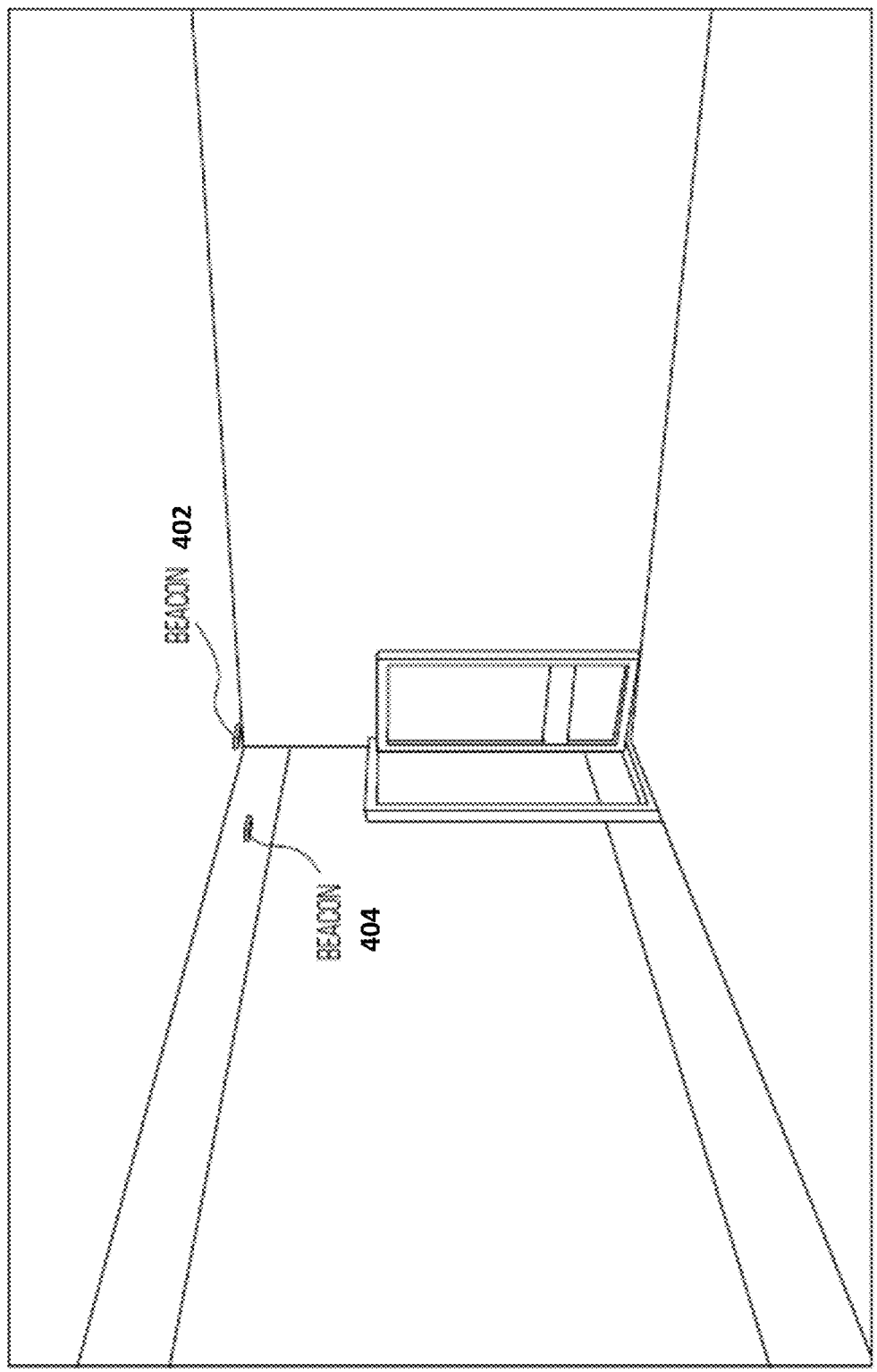
FIG. 5 illustrates an example of a boundary in a building with BLE beacons.

FIG. 4 illustrates an example of a building with one or more boundaries and one or more BLE beacons (the numbered or lettered circles in the diagram) adjacent each boundary. FIG. 5 illustrates an example of a boundary in a building with BLE beacons. In this example, the boundary in the three dimensional space is a door into a room has a first BLE beacon 402 inside of the room and a second BLE beacon 404 outside of the room in a hallway. As described above, each BLE beacon has a directional antenna and has the stronger signal directed away from the door. Thus, using the method for rapid room entry described above and below, the system is able to determine when a BLE enabled object, such as a person carrying a BLE tag or a BLE smartphone or a physical asset, crosses into or out of the room.

Figure 6:
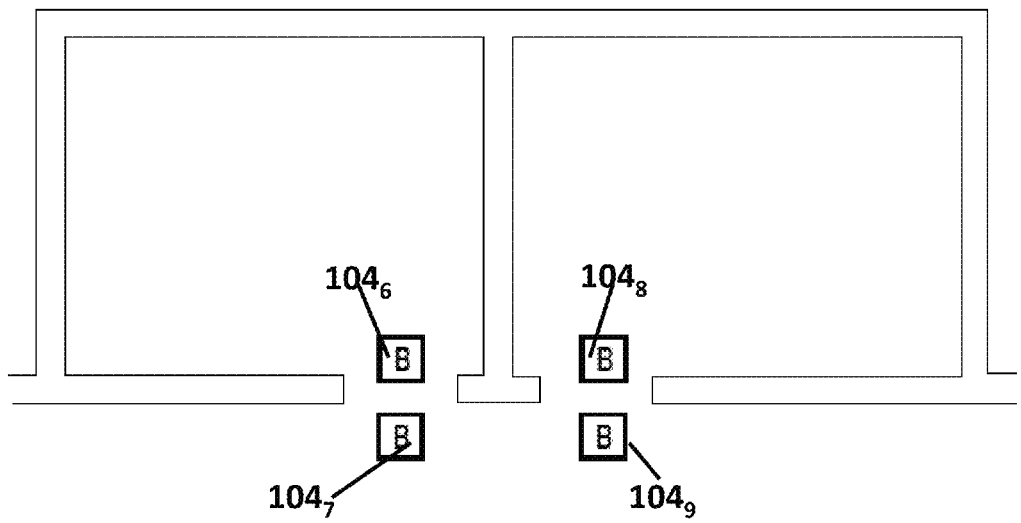
FIG. 6 illustrates a simplified view of two adjacent doors in a building and the positioning of the BLE beacons for the doors.

FIG. 6 illustrates a simplified view of two adjacent doors in a building and the positioning of the BLE beacons with directional antennas $104_6$, $104_7$, $104_8$ and $104_9$ for the doors. Similar to FIG. 5 above, the BLE beacons may be in a fixed location on either side of the door to allow the system to perform the rapid room entry method for a BLE enabled object entering or exiting the door (crossing the boundary). Also, the single BLE beacon inside the room may be used by the system, based on proximity of the BLE beacon to the BLE enabled object, to determine whether or not the BLE enabled object is in the room.

Figure 7:
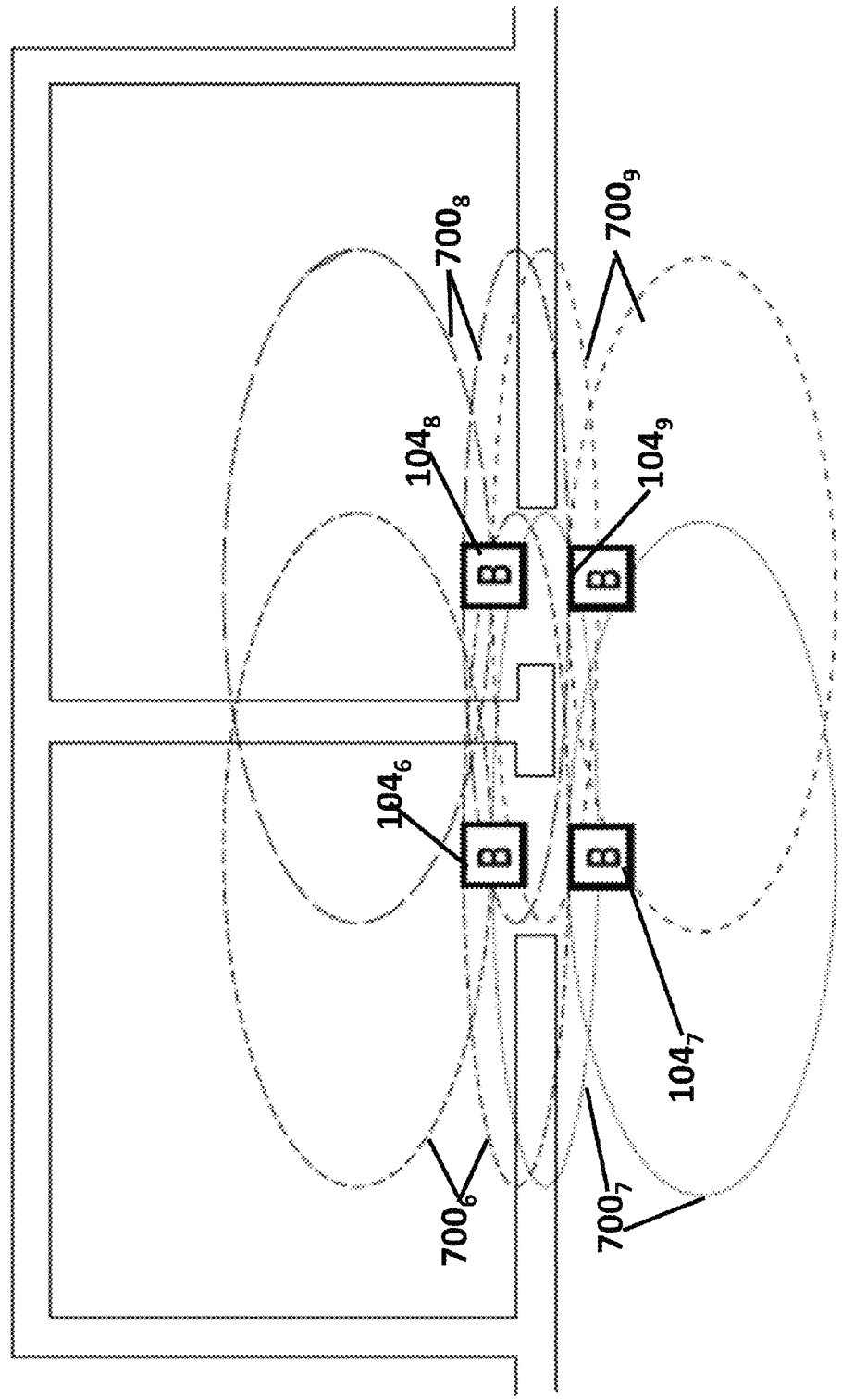
FIG. 7 illustrates an example of the radiation pattern for the BLE beacons shown in FIG. 6.

FIG. 7 illustrates an example of the radiation pattern for the BLE beacons shown in FIG. 6. BLE beacon $104_6$ has two lobes of the radiation pattern $700_6$ that, due to the directional antenna of the BLE beacon, have a strong portion of the signal directed away from the boundary and a weak portion of the signal directed towards the boundary. Similarly, beacons $104_7$, $104_8$, $104_9$ have two lobes of the radiation pattern $700_7$, $700_8$, and $700_9$ that, due to the directional antenna of the BLE beacon, have a strong portion of the signal directed away from the boundary and a weak portion of the signal is towards the boundary.

FIG. 8 illustrates an example of the raw and smoothed RSSI values for two BLE beacons that can be used to determine when a user crossed a boundary and helps further illustrate the principle of operation of the system. For the system, BLE beacons with a rapid beacon rate, depending on the desired latency, are use that have highly directional antennas. The boundary shown in FIG. 7 is a doorway, and in this case, two adjacent doorways are used. The directional antennas are aligned so that the strong lobes of energy are radiating away from the boundary (doorway), with the weak lobes radiating into the doorway. By doing this, the RSSI profile over the boundary—that is, the RSSI versus the distance from the beacon while crossing the boundary—has a very steep curve, creating a large differentiation between the two sides. As shown in FIG. 8, as a BLE enabled object crosses the boundary, the RSSI of the beacons will rapidly increase and decrease over a small distance and intersect which indicates a crossing of the boundary for the particular BLE enabled object that received the signals shown in FIG. 8. As the RSSI varies, the samples can be processed by a location engine using a differential, triangulation, or trilateration algorithm to determine distance from the various beacons and/or in which room the device now resides.

Figure 9:
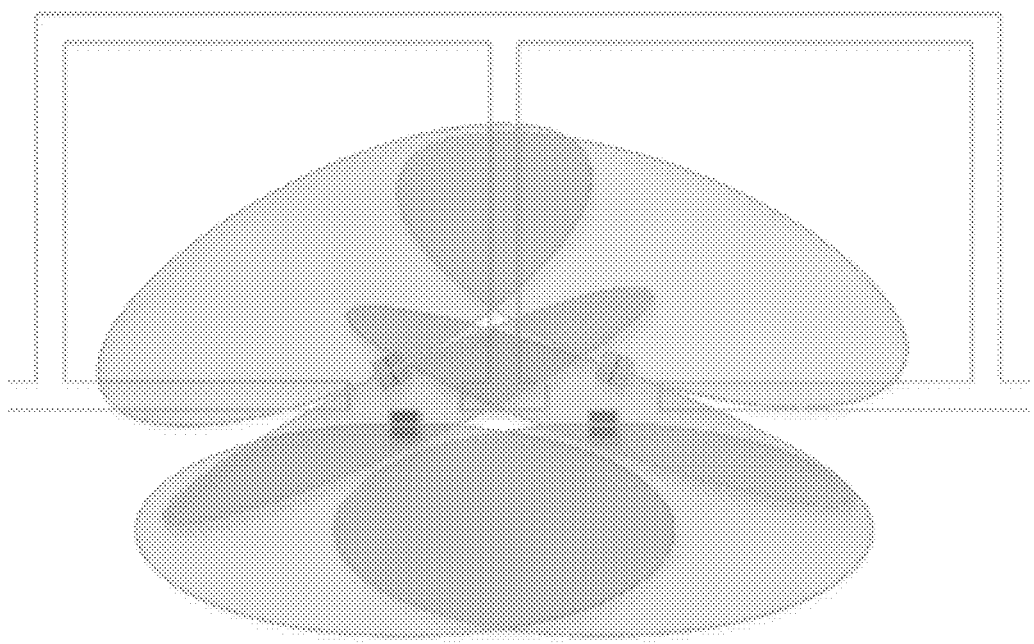
FIG. 9 illustrates another implementation of the system using angled radiation patterns for the beacons.

FIG. 9 illustrates another implementation of the system using angled radiation patterns for the beacons $104_6$, $104_7$, $104_8$ and $104_9$. It should be understood that the precise location and angular orientation of each BLE beacon in the three dimensional space is adjustable depending on the needs for a particular boundary. For example, the layout shown in FIG. 9 improves side-to-side differentiation. Thus, the system and method described herein is not limited to any particular location and/or orientation of the BLE beacons The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
   two Bluetooth low energy (BLE) beacons adjacent a boundary in an area with a first BLE beacon mounted on a first side of the boundary in the area and a second BLE beacon mounted on a second side of the boundary in the area, each BLE beacon having a directional antenna so that a portion of the signal having a strong strength is directed away from the boundary and a portion of the signal having a weaker strength is directed towards the boundary;
   a BLE enabled object that senses a signal from each of the two BLE beacons adjacent the boundary in the area and captures one or more characteristics of the signal for the two BLE beacons adjacent the boundary in the area; and
   a location engine that determines when the one or more captured characteristics of the signal for the two BLE beacons adjacent the boundary intersect each other and determines, based on the intersection of the one or more captured characteristics of the signal for the two BLE beacons adjacent the boundary, a crossing of the boundary by the BLE enabled object.

2. The system of claim 1, wherein the one or more characteristics of the signal for each BLE beacon further comprises a received signal strength indication for each BLE beacon.

3. The system of claim 1, wherein the BLE enabled object senses one of a periodic signal from each BLE beacon and a continuous signal from each BLE beacon.

4. The system of claim 1, wherein the location engine is resident in the BLE enabled object.

5. The system of claim 1, wherein the location engine is remote from the BLE enabled object and the BLE enabled object communicates the one or more captured characteristics of the signal for the two BLE beacons to the remote location engine and wherein the remote location engine communicates the determination of the crossing of the boundary by the BLE enabled object back to the BLE enabled object.

6. The system of claim 1, wherein the BLE enabled object is one of a smartphone device, a tag and a medical device.

7. The system of claim 1, wherein determining the crossing of the boundary by the BLE enabled object further comprises determining a movement of the BLE enabled object through a door.

8. The system of claim 1, wherein the location engine determines a movement of the BLE enabled object into an area in three dimensional space.

9. The system of claim 8, wherein the area is one of a floor and room in the three dimensional space and an area defined by a set of location coordinates, wherein the set of location coordinates further comprises one of an X and Y coordinate and an X, Y and Z coordinate.

10. The system of claim 2, wherein the location engine uses the intersection of the received signal strength indication of the two BLE beacons to determine the crossing of the boundary by the BLE enabled object.

11. The system of claim 1, wherein the BLE enabled object senses a signal from one BLE beacon located in a particular area and the location engine uses a proximity of the one BLE beacon to determine a presence of the BLE enabled object in the area.

12. A method, comprising:
   providing a location determining system having two Bluetooth low energy (BLE) beacons adjacent a boundary in an area with a first BLE beacon mounted on a first side of the boundary in the area and a second BLE beacon mounted on a second side of the boundary in the area, each BLE beacon having a directional antenna so that a portion of the signal having a strong strength is directed away from the boundary and a portion of the signal having a weaker strength is directed towards the boundary;
   sensing, by a BLE enabled object, a signal from each of the two BLE beacons adjacent the boundary in the area, the sensing further comprising capturing one or more characteristics of the signal for the two BLE beacons adjacent the boundary in the area;
   comparing the one or more captured characteristics of the signal for the two BLE beacons adjacent the boundary in the area;
   determining when the one or more captured characteristics of the signal for the two BLE beacons adjacent the boundary intersect each other; and
   determining, based on the intersection of the one or more captured characteristics of the signal for the two BLE beacons adjacent the boundary in the area, a crossing of the boundary by the BLE enabled object.

13. The method of claim 12, wherein the one or more characteristics of the signal for each BLE beacon further comprises a received signal strength indication for each BLE beacon.

14. The method of claim 12, wherein sensing the signal from the BLE beacons further comprises sensing a periodic signal from each BLE beacon or continuously sensing a signal from each BLE beacon.

15. The method of claim 12 further comprising communicating the one or more gathered characteristics of the signal for the two BLE beacons from the BLE enabled object to a remote location engine.

16. The method of claim 15, wherein determining the crossing of the boundary by the BLE enabled object further comprises determining, at the remote location engine, the crossing of the boundary by the BLE enabled object.

17. The method of claim 15 further comprising communicating the determination of the crossing of the boundary by the BLE enabled object back to the BLE enabled object.

18. The method of claim 12, wherein determining the crossing of the boundary by the BLE enabled object further comprises determining a movement of the BLE enabled object through a door.

19. The method of claim 12, wherein determining the crossing of the boundary further comprises determining a movement of the BLE enabled object into an area in three dimensional space.

20. The method of claim 19, wherein the area is one of a floor and room in the three dimensional space and an area defined by a set of location coordinates and the set of location coordinates further comprises one of an X and Y coordinate and an X, Y and Z coordinate.

21. The method of claim 13, wherein determining the crossing of the boundary further comprises using the intersection of the received signal strength indication of the two BLE beacons to determine the crossing of the boundary by the BLE enabled object.

22. The method of claim 12, wherein sensing the signals from the two BLE beacons further comprises sensing a signal from one BLE beacon located in a particular area and wherein determining the crossing of the boundary further comprises using a proximity of the one BLE beacon to determine a presence of the BLE enabled object in the area.

23. An apparatus, comprising:
a device having a processor, a memory and a Bluetooth low energy (BLE) receiver;
wherein the Bluetooth low energy receiver senses a signal from two Bluetooth low energy (BLE) beacons adjacent a boundary in an area with a first BLE beacon mounted on a first side of the boundary in the area and a second BLE beacon mounted on a second side of the boundary in the area and captures one or more characteristics of the signal for the two BLE beacons, each BLE beacon having a directional antenna so that a portion of the signal having a strong strength is directed away from the boundary and a portion of the signal having a weaker strength is directed towards the boundary; and
wherein the processor of the device determines when the one or more captured characteristics of the signal for the two BLE beacons adjacent the boundary intersect each other and determines, based on the intersection of the one or more captured characteristics of the signal for each of the two BLE beacons adjacent the boundary in the area, a crossing of the boundary by the device.

24. The apparatus of claim 23, wherein the one or more characteristics of the signal for each BLE beacon further comprises a received signal strength indication for each BLE beacon.

25. The apparatus of claim 23, wherein the Bluetooth low energy receiver one of senses a periodic signal from each BLE beacon and continuously senses a signal from each BLE beacon.

26. The apparatus of claim 23, wherein the processor determines a movement of the device through a door.

27. The apparatus of claim 23, wherein the processor determines a movement of the BLE enabled object into an area in three dimensional space.

28. The apparatus of claim 27, wherein the area is one of a floor and room in the three dimensional space and an area defined by a set of location coordinates and the set of location coordinates further comprises one of an X and Y coordinate and an X, Y and Z coordinate.

29. The apparatus of claim 24, wherein the device uses the intersection of the received signal strength indication of the two BLE beacons to determine the crossing of the boundary by the BLE enabled object.

30. The apparatus of claim 23, wherein the Bluetooth low energy receiver senses a signal from one BLE beacon located in a particular area and the device uses a proximity of the one BLE beacon to determine a presence of the BLE enabled object in the area.

31. A system, comprising:
a building having at least one doorway;
two Bluetooth low energy (BLE) beacons including a first BLE beacon mounted on a first side of the doorway and a second BLE beacon mounted on a second side of the doorway, each BLE beacon having a directional antenna so that a portion of the signal having a strong strength is directed away from the doorway and a portion of the signal having a weaker strength is directed towards the doorway;
a BLE enabled object that senses a signal from each of the two BLE beacons adjacent the doorway and captures a received signal strength of the signal for each of the two BLE beacons; and
a location engine that determines when the received signal strength of the signal for the two BLE beacons adjacent the doorway intersect each other and determines, based on the intersection of the received signal strength of the signal for the two BLE beacons adjacent the doorway, a crossing of the doorway by the BLE enabled object.

* * * * *